United States Patent [19]

Utsumi et al.

[11] Patent Number: 4,759,604

[45] Date of Patent: Jul. 26, 1988

[54] OPTICAL MULTICONDUCTOR OF SILICA GLASS TYPE

[75] Inventors: Atsushi Utsumi; Hiroyuki Hayami, both of Itami, Japan

[73] Assignee: Mitsubishi Cable Industries Ltd., Amagasaki, Japan

[21] Appl. No.: 940,470

[22] Filed: Dec. 11, 1986

[30] Foreign Application Priority Data

| Dec. 20, 1985 | [JP] | Japan | 60-288682 |
| May 6, 1986 | [JP] | Japan | 61-104422 |
| May 6, 1986 | [JP] | Japan | 61-104423 |
| May 6, 1986 | [JP] | Japan | 61-104424 |
| Aug. 21, 1986 | [JP] | Japan | 61-196822 |
| Aug. 21, 1986 | [JP] | Japan | 61-196823 |

[51] Int. Cl.$^4$ ............... G02B 6/00
[52] U.S. Cl. ............... 350/96.29; 350/96.15
[58] Field of Search ............... 350/96.15, 96.29–96.34

[56] References Cited

U.S. PATENT DOCUMENTS

| 3,190,735 | 6/1965 | Kapany | 350/96.2 |
| 3,253,500 | 5/1966 | Hicks | 350/96.29 |
| 3,554,720 | 1/1971 | Crepet | 350/96.27 |
| 3,963,468 | 6/1976 | Jaeger et al. | 350/96.12 |
| 4,647,153 | 3/1987 | Utsumi et al. | 350/96.25 |

FOREIGN PATENT DOCUMENTS

| 0084216 | 7/1983 | European Pat. Off. . |
| 0101742 | 3/1984 | European Pat. Off. . |
| 0102395 | 3/1984 | European Pat. Off. . |
| 54-112218 | 9/1979 | Japan . |
| 56-78808 | 6/1981 | Japan . |
| 57-73703 | 5/1982 | Japan . |
| 60-137845 | 7/1985 | Japan . |
| 60-137846 | 7/1985 | Japan . |
| 2033889 | 5/1980 | United Kingdom . |

Primary Examiner—Gene Wan
Attorney, Agent, or Firm—Armstrong, Nikaido, Marmelstein & Kubovcik

[57] ABSTRACT

An optical multiconductor of the silica glass type characterized in that the multiconductor comprises $10^2$ to $10^7$ optical fibers of the silica glass type fused to one another, each of the optical fibers comprising a core made of doped silica glass and occupying at least 20% of the fiber in cross sectional area, and a cladding layer made of a kind of silica glass and formed on the core, the core having a refractive index distribution satisfying the following expression:

$$n2 \geq n1 + 0.50(n0 - n1)$$

wherein $n0$ is the refractive index of the core at its center, $n1$ is the refractive index of the core at its outermost portion, and $n2$ is the refractive index of the core at a position centered about the axis of the core and having an average radius of $0.65r1$, the $r1$ being an average radius of the core.

The multiconductor is suited to use as the image transmitter of an image scope for industrial, medical or other uses.

14 Claims, 2 Drawing Sheets

OPTICAL MULTICONDUCTOR OF SILICA GLASS TYPE

BACKGROUND OF THE INVENTION

1. Field of the Invention

The present invention relates to optical multiconductors of the silica glass type which are suited as image transmitters for various image scopes for industrial, medical and other uses, especially as image transmitters for medical image scopes.

2. Description of the Prior Art

Image scopes transmitting sharp images and having the smallest possible diameter are required for directly observing in detail portions or sites which are usually difficult to observe, such as the interior of hot blast furnaces, the interior of atomic reactors exposed to radiation, internal portions of the human body or animals, narrow or constricted inner portions of devices, etc.

Conventional image scopes have an optical multiconductor serving as an image transmitter and comprising a multiplicity of optical fibers of the multicomponent glass type. As is well known, however, multicomponent glass is low in resistance to heat and radiation and generally contains large quantities of impurities, which have heretofore presented extreme difficulties in fabricating thinner optical fibers, consequently imposing limitations on the reduction of the diameter of the optical multiconductor.

In contrast, silica glass has high resistance to heat and radiation, is excellent in drawability and therefore has the advantage that a bundle of a large required number of optical fiber preforms, each composed basically of a core and a cladding layer, can be easily drawn into a multiconductor of reduced diameter which can in no way be produced from multicomponent glass.

In the case of optical fiber preforms in which the core is made of doped silica glass, different dopants are usable in varying amounts to increase the refractive index difference between the core and the cladding layer, with the result that leakage of light can be prevented effectively even with a thin cladding layer. Accordingly, the drawing ratio can be increased to afford an optical multiconductor of decreased diameter.

For preparing such optical fiber preforms having a core of doped silica glass, there is a need to use, for example, core rods of doped silica glass, whereas such core rods heretofore used are not those prepared for producing image scopes but are only those intended for the fabrication of communication optical fibers. Moreover, the conventional core rods have a paraboric refractive index distribution that is the refractive index greatly decreases from the center of the rod toward its surface as indicated by Curve 1 in FIG. 7. Accordingly, when these core rods are used for producing an optical multiconductor, the multiconductor obtained has the problem that each fiber serving as a picture element is bright only at its central portion and greatly increases in darkness from the center toward the outer periphery. Thus, as the diameter of the multiconductor decreases, the image transmitted therethrough becomes less easy to view.

SUMMARY OF THE INVENTION

The main object of the present invention is to provide an optical multiconductor which has fiber cores of the graded index type and which nevertheless is free of the above problem and is therefore capable of transmitting sharp and bright images although having a reduced diameter.

Stated more specifically, the present invention provides an optical multiconductor of the silica glass type characterized in that the multiconductor comprises $10^2$ to $10^7$ optical fibers of the silica glass type fused to one another, each of the optical fibers comprising a core made of doped silica glass and having an average radius of r1, and a cladding layer made of a kind of silica glass and formed on the core, the core having a refractive index distribution satisfying the following expression (1):

$$n2 \geq n1 + 0.50(n0 - n1) \qquad (1)$$

wherein n0 is the refractive index of the core at its center, n1 is the refractive index of the core at its outermost portion, and n2 is the refractive index of the core at a position centered about the axis of the core and having an average radius of 0.65r1.

DETAILED DESCRIPTION OF THE INVENTION

Figure 8:
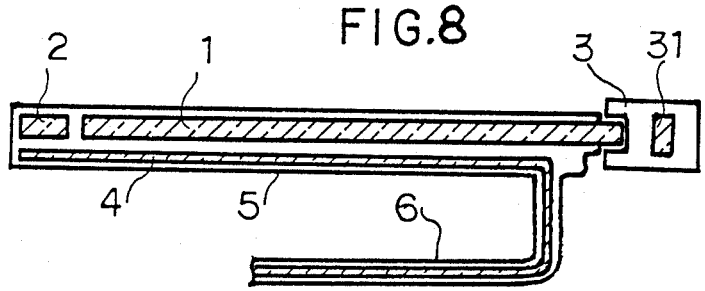
FIG. 8 is a sectional view showing an example of image scope incorporating the optical multiconductor of the invention as an image transmitter.

FIG. 8 shows an optical multiconductor 1 of the present invention serving as an image transmitter, an objective lens 2 mounted on the front end of the multiconductor 1, a removable eyepiece 3 mounted on the rear end of the multiconductor 1, an ocular lens 31 installed within the eyepiece 3 and an illuminating light guide 4. At least a specified length of front end portion of the light guide 4 is housed in a protective tube 5 coextensive with the multiconductor 1 for protecting the conductor 1 over the entire length thereof. The remaining rear portion of the guide 4 is branched and encased in a protective tube 6. When heat resistance, rather than flexibility, is required of the image scope, the protective tubes 5 and 6 are made of a metal such as stainless steel, titainum or copper. When flexibility is especially required for medical use, etc., these tubes are made of a flexible organic high polymer such as nylon, polyethylene, polypropylene or polyvinyl chloride. When the present device is to be used as a medical image scope, the protective tube 5 houses therein, in combination with the multiconductor and in addition to the light guide 4, other means such as water conduit, gas conduit, forceps, baloon, tip articulation, laser fiber, electric coagulator or the like.

FIGS. 1 to 6 show optical multiconductors 1 and a multiplicity of optical fibers 7 constituting each multiconductor 1. According to the embodiment shown in FIGS. 1 and 2, each of the optical fibers 7 comprises a core 71 and a cladding layer 72 formed on the core 71. The adjacent cladding layers 72 are fused and joined to one another. According to the embodiment of FIGS. 3 and 4, a first cladding layer 72 over a core 71 further has thereon a second cladding layer 73, and the adjacent cladding layers 73 are joined to one another by fusion. Further according to the embodiment of FIGS. 5 and 6, the second cladding layer 73 is covered with a third cladding layer 74, and the adjacent third cladding layers 74 are joined to one anther by fusion. Indicated at 8 is a skin layer provided over the outermost portion of the multiconductor 1, and at 9 a reinforcing layer covering the skin layer 8 and made, for example, of organic high polymer cured by UV rays or heat or thermoplastic organic high polymer.

With reference to FIGS. 1-6 indicated at Df is the diameter of the optical fiber 7, at Dc the diameter of the core 71 (which has an average radius of r1), at T1 the thickness of the first cladding layer 72, at T2 the thickness of the second cladding layer 73, and at T3 the thickness of the third cladding layer 74. It is further assumed that the multiconductor 1 has a diameter Dm, the skin layer 8 has a thickness Ts and the reinforcing layer 9 has a thickness Tp.

Usually the optical multiconductor 1 can be prepared from $10^2$ to $10^7$, preferably $10^3$ to $5\times10^6$, optical fiber performs each having a circular cross section and a structure corresponding to the optical fiber 7 in cross section, by filling the preforms in an orderly arrangement into a skin pipe (for forming the skin layer 8 of FIGS. 1, 3 or 5) of natural silica glass or synthetic silica glass, preferably of synthetic silica glass, and subsequently drawing the assembly. During the drawing, the optical fibers are fused to one another and thereby deformed in cross section to a hexagonal shape as seen in FIGS. 2, 4 or 6 or to a shape slightly or considerably collapsed from the hexangonal shape. Unless otherwise stated in the following description, the values Df, Dc, T1, T2 and T3 typically show the values of corresponding parallel portions of hexagonal cross sections as illustrated, while as to the fibers of a shape considerably deformed from a hexagon, the values given are those of the corresponding illustrated parallel portions of a hexagon which is equal in area to the deformed shape. The refractive index distribution of the core 71 will be described with reference to FIG. 7 assuming that the core has a circular cross section with an average radius of r1. However, when the core is hexagonal or of a shape other than circular in cross section, the description is to be interpreted as being given as to a circle which is equal in area to the section of the core.

The core 71 of each optical fiber 7 occupies preferably at least 20% of the fiber in cross sectional area (hereinafter area ratio). If the core area ratio is less than 20%, the amount of light to be transmitted through the core 71 is small, and it is difficult to transmit a bright image therethrough. If the core area ratio is excessively great, the cladding layer becomes too thin unless the flexibility of the multiconductor is sacrificed, presenting difficulty in transmitting sharp images due to obscurity. Accordingly, the core area ratio is preferably up to 60%, more preferably 25 to 50%.

With reference to FIG. 2, the values Df and T1 are about 3 to about 16 μm and about 0.5 to about 5 μm, respectively, preferably about 4 to about 15 μm and about 1 to about 4 μm, respectively. With reference to FIG. 4, the values Df, T1 and T2 are about 3 to about 16 μm, about 0.3 to about 4 μm and about 0.01 to about 2 μm, respectively, preferably about 3.5 to about 10 μm, about 0.5 to about 2.5 μm and about 0.01 to about 1.5 μm, respectively. With reference to FIG. 6, the values Df, T1, T2 and T3 are about 3 to about 16 μm, about 0.03 to about 1.2 μm, about 0.15 to about 2.5 μm and about 0.01 to about 1.5 μm, respectively, preferably about 3.5 to about 15 μm, about 0.05 to about 1.0 μm, about 0.2 to about 2.0 μm and about 0.05 to about 0.8 μm, respectively.

Figure 7:
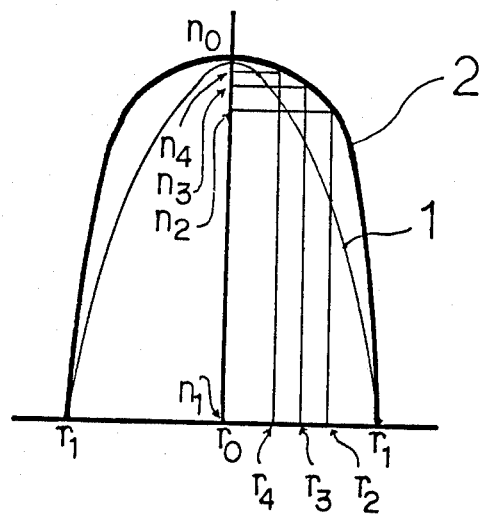
FIG. 7 is a diagram showing the refractive index distributions of the cores of optical fibers constituting optical multiconductors.

Referring to FIG. 7, Curve 2 is a refractive index distribution curve of the core 71 of each optical fiber 7 constituting the multiconductor of the invention. For reference, Curve 1 is also given which is the refractive index distribution curve of a core rod for preparing a usual communication graded index-type optical fiber. With Curve 2, the difference (Δn) between the refractive index n0 of the core 71 at its center r0 (where the core usually has a maximum refractive index) and the refractive index n1 of the core at its outermost portion r1 (where the core usually has a minimum refractive index), i.e. (n0−n1), is 0.015 to 0.040, preferably 0.02 to 0.035.

In the refractive index distribution represented by Curve 2, the refractive index decreases gently in the section of the core from its center r0 to the portion thereof having an average radius of r2, i.e. 0.65r1, whereas the refractive index decreases greatly in the core section ranging from r2 to r1 in average radius, i.e. the outer core section up to the outermost portion of the core. In other words, the variations in the refractive index are small in the section of from r0 to r2. Moreover, the refractive index n2 at the position of radius r2 is greater than n1+0.5(Δn) (e.g. when Δn is 0.025, n1+0.5×0.025=n1+0.0125). Thus, the core 71, although of the GI type in the distribution of refractive indexes, is small in the reduction of refractive index and is not smaller than a value in this index in the section from the center r0 to the radius r2, so that the core has sufficiently useful brightness in this section and also in a somewhat outer region thereof.

For the reason stated above, it is desired that the variations in refractive index be great in the outward portion of the core 71 and be more gentle in the central portion of the core. It is therefore desired that the refractive index n2 at r2 satisfy the following expression (2).

$$n2 \geq n1 + 0.65(n0 - n1) \tag{2}$$

In addition to the refractive index n2 at r2 (=0.65r1) thus defined, it is also desirable that Curve 2 have the refractive index n3 at r3 (=0.5r1) and/or the refractive index n4 at r4 (=0.33r1) which are given by the following expressions (3) to (6), respectively.

$$n3 \geq n1 + 0.55(n0 - n1), \tag{3}$$

preferably $$n3 \geq n1 + 0.67(n0 - n1). \tag{4}$$

$$n4 \geq n1 + 0.60(n0 - n1), \tag{5}$$

preferably $$n4 \geq n1 + 0.70(n0 - n1). \quad (6)$$

More desirably, Curve 2 has a refractive index of n1+0.5(n0−n1) at the position of an average radius 0.7r1, in addition to the foregoing refractive index distribution conditions.

The refractive index distribution of the core described above can be realized by using a dopant, such as germanium or phosphorus, which acts to increase the refractive index of silica glass and controlling the amount of the dopant by the VAD, CVD or like process according to the specified refractive index distribution. Halides of the above dopant such as germanium tetrachloride are preferably used as a dopant precursor.

According to the present invention, the core 71 of the optical fiber 7 may have only one cladding layer 72 as in the embodiment of FIG. 2 or two or three cladding layers which are different from one another in refractive index as seen in FIG. 4 or 6. Generally from the viewpoint of sharpness of transmitted images, the difference between the refractive index n1 (usually, minimum refractive index) of the outermost portion of the core 71 and that of the cladding layer 72 is preferably greater, while the core 71 may preferably be provided with at least two cladding layers.

According to the embodiment shown in FIG. 2, the difference between the refractive index n1 of the outermost portion of the core 71 and the refractive index of the cladding layer 72 may be zero but is preferably at least 0.006, more preferably at least 0.008, most preferably at least 0.010. With the embodiment shown in FIG. 4, it is desired that the first cladding layer 72 be preferably at least 0.006, more preferably at least 0.008, most preferably at least 0.010, lower in refractive index than the minimum refractive index n1 of the core 71 at its outermost portion and also preferably at least 0.004, more preferably at least 0.008, most preferably at least 0.010, lower than the second cladding layer in refractive index. With the embodiment shown in FIG. 6, it is desirable that the first cladding layer 72 be preferably at least 0.008, more preferably at least 0.010, most preferably at least 0.012, lower in refractive index than the minimum refractive index n1 of the core outermost portion and also lower than any one of the second and third cladding layers in refractive index, and that the second cladding layer have a lower refractive index than the third cladding layer. Stated more specifically, the first cladding layer 72 is preferably at least 0.002, more preferably at least 0.004, lower than the second cladding layer 73 in refractive index, while the second cladding layer 73 is preferably at least 0.004, more preferably at least 0.008, most preferably at least 0.010, lower than the third cladding layer 74 in refractive index.

The cladding layer 72 of FIG. 2, the first cladding layer 72 of FIG. 4 and the first cladding layer 72 and the second cladding layer 73 of FIG. 6 are preferably made of silica glass doped with fluorine and/or boron or with a dopant composed primarily of at least one of these elements. More preferably, these layers are made of pure silica glass doped with BCl3, BF3 or a mixture thereof as a dopant precursor. On the other hand, the second cladding layer 73 of FIG. 4 and the third cladding layer 74 of FIG. 6 may be made of silica glass doped with at least one of various dopants, but it is desirable to prepare these layers from silica glass at least 1800° C. in drawing temperature, for example, pure silica glass, especially one having a purity of at least 99.99 wt. %. The following advantage will then result. The above-mentioned drawing temperature is defined as the lowest temperature at which when a tube made of the silica glass to be tested and measuring 23 mm in inside diameter and 26 mm in outside diameter is softened by heating and drawn into a tube, 2.3 mm in inside diameter and 2.6 mm in outside diamter, at a rate of 0.5 m/min, the tube can be drawn under a tension of not higher than 500 g.

Generally, sharp transmitted images can be obtained when the optical fibers present in the portion of the multiconductor 1 within at least 80% of the radius from the center of its cross section are fused to one another into a honeycomb structure which is regular to the greatest possible extent. (The portion within 80% of the radius may include a locally slightly collapsed honeycomb structure, dark points or other defects, while the honeycomb structure need not always be a set of geometric hexagons but can be a set of slightly deformed hexagons.) Such a multiconductor includes a relatively small number of optical fibers, e.g. about 1,000 to 5,000 fibers, has a small outside diameter Dm of up to 0.8 mm and is suited to medical uses, especially as an angioscope. Multiconductors of the above structure can be obtained generally by using for the outermost layer (the second cladding layer 73 of FIG. 4, the third cladding layer 74 of FIG. 6, or the like) of the optical fiber 7 a glass material (such as the above-mentioned pure silica glass) having a higher drawing temperature than the glass for the inner layer(s) (although the core forming glass can be equal to or slightly higher than the outermost layer glass material in drawing temperature), and drawing a bundle of optical fiber preforms at the drawing temperature of the glass material or at a slightly higher temperature. The glass material forming the outermost layer then exhibits a minimum degree of flowability required for drawing, acting to prevent an excessive flow (which would give an irregular cross section to the optical fibers) even if the glass matatrial for the inner layer exhibits great flowability.

Figure 1:
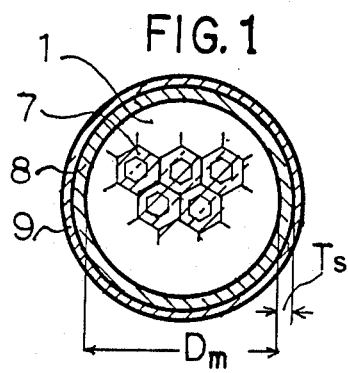
FIG. 1 is a sectional view of an optical multiconductor embodying the present invention.
Figure 2:
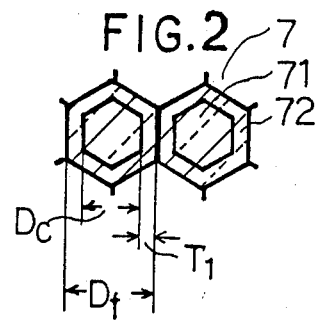
FIG. 2 is an enlarged fragmentary view in section showing the embodiment of FIG. 1.
Figure 3:
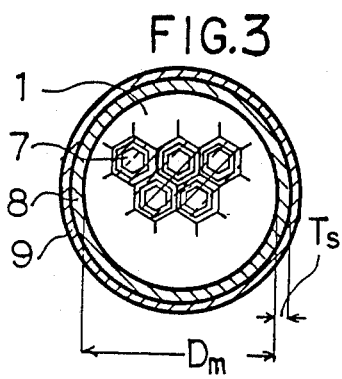
FIG. 3 is a sectional view of another optical multiconductor embodying the present invention.
Figure 4:
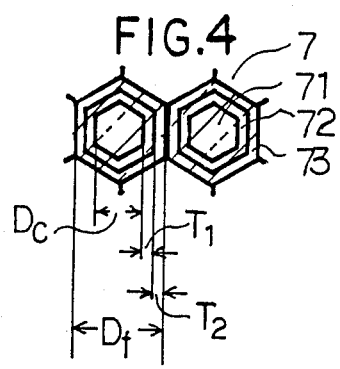
FIG. 4 is an enlarged fragmentary view in section showing the embodiment of FIG. 3.
Figure 5:
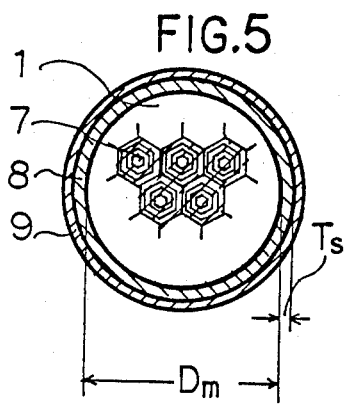
FIG. 5 is a sectional view of another optical multiconductor embodying the present invention.
Figure 6:
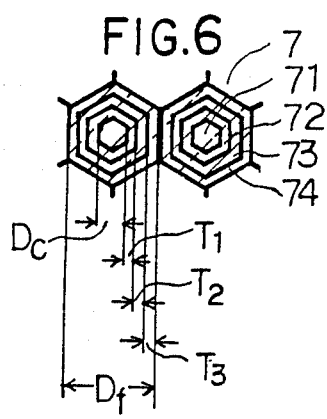
FIG. 6 is an enlarged fragmentary view in section showing the embodiment of FIG. 5.

With reference to FIGS. 1, 3 and 5, the skin layers 8 are preferably at least about 3 μm, more preferably 5 to 20 μm, in thickness. The reinforcing layers 9 are preferably at least about 5 μm, more preferably 10 to 150 μm, in thickness.

The optical multiconductors of the present invention are useful as image transmitters for image scopes for industrial and medical uses, especially for medical image scopes including angioscopes and endoscopes for various tubes or ducts in the body such as the coronary artery, oviduct, urinary tract and bile duct, gastroscopes, hysteroscopes, cystoscopes, embryoscopes, otoscopes, rhinoscopes, ophthalmoscopes, encephaloscopes, arthroscopes, dental image scopes, etc.

For use as the image transmitters of medical image scopes, the optical multiconductors of the invention afford sharp images and are therefore very desirable when filfilling the following requirements (1) to (4).
(1) Like the embodiment of FIG. 4 or 6, the multiconductor has two or three cladding layers.
(2) The second cladding layer 73 of FIG. 4 or the third cladding layer 74 of FIG. 6 is made of silica glass at least 1800° C. in drawing temperature, preferably pure silica glass, more preferably pure silica glass having a high purity of at least 99.99 wt. %.

(3) The core 71 of each optical fiber 7 of the multiconductor occupies at least 20% of the fiber in cross sectional area.

(4) The values Df, T1 and T2 in FIG. 4 are preferably 3.0 to 8.0 μm, 0.5 to 1.5 μm and 0.03 to 0.6 μm, respectively, preferably 3.5 to 6.5 μm, 0.7 to 1.2 μm and 0.05 to 0.4 μm, respectively, more preferably 4.0 to 5.5 μm, 0.8 to 1.0 μm and 0.07 to 0.2 μm, respectively. The values Df, T1, T2 and T3 in FIG. 6 are 3.0 to 8.0 μm, 0.02 to 0.7 μm, 0.1 to 1.5 μm and 0.02 to 0.6 μm, respectively, preferably 3.5 to 6.5 μm, 0.05 to 0.4 μm, 0.2 to 1.3 μm and 0.05 to 0.4 μm, respectively, more preferably 4.0 to 5.5 μm, 0.1 to 0.3 μm, 0.4 to 1.0 μm and 0.08 to 0.3 μm, respectively.

Further for use as the image transmitters of the above-mentioned endoscopes and angioscopes, especially of angioscopes, the multiconductors of the invention preferably fulfill the following requirements (5) to (7) in addition to the foregoing requirements (1) to (4).

(5) The multiconductor comprises 1,000 to 5,000, preferably 2,000 to 4,000, optical fibers.

(6) The outside diameter (Dm+2Ts) of the skin layer 8 is about 0.1 to about 0.8 mm, preferably about 0.2 to about 0.6 mm.

(7) The protective tube 5 of the image scope of FIG. 8 is up to 3 mm, preferably up to 2.5 mm, in outside diameter and further has an outside diameter of up to about 1.8 mm over the 5- to 15-cm-long front end portion of the tube 5.

Further when the multiconductors of the the invention are to be used as the image transmitters of endoscopes for the gastrointestinal organs such as the esophagus, stomach and intestines, it is desired that the conductors fulfill the following requirements (8) to (10) in addition to the foregoing requirements (1) to (4).

(8) The multiconductor comprises 5,000 to 30,000, preferably 8,000 to 25,000, optical fibers.

(9) The outside diameter (Dm+2Ts) of the skin layer 8 is about 0.2 to about 1.5 mm, preferably about 0.4 to about 1.0 mm.

(10) The protective tube 5 of the image scope of FIG. 8 is about 3 to about 10 mm, preferably about 4 to about 7 mm, in outside diameter.

Further when the multiconductors of the invention are to be used as the image transmitters of hysteroscopes, cystoscopes, embryoscopes, arthroscopes and endoscopes for other organs, especially as those for precision observation endoscopes in place of conventional lens scopes, it is desirable that the conductors fulfill the following requirements (11) to (13) in addition to the foregoing requirements (1) to (4).

(11) The multiconductor comprises 30,000 to 100,000, preferably 50,000 to 100,000, optical fibers.

(12) The outside diameter (Dm+2Ts) of the skin layer 8 is about 0.5 to about 3.0 mm, preferably about 1.0 to about 2.5 mm.

(13) The protective tube 5 of the image scope of FIG. 8 is about 2 to about 10 mm, preferably about 3 to about 7 mm, in outside diameter.

EXAMPLES 1–31 AND COMPARATIVE EXAMPLES 1 AND 2

Listed in Table 1 are the detailed structure of optical fiber preforms used in each of the above Examples and Comparative Examples, the structure of an optical multiconductor obtained in each example by compactly filling a specified number of optical fiber preforms (given in the line of symbol N in the structure of multiconductor in the table) into a pure silica glass tube and drawing the assembly at 2100° C., and the quality of images transmitted through the multiconductor. Each refractive index value listed was determined at 20° C. using infrared rays of 0.90 μm in wavelength. The value n1 is 1.453.

The quality of transmitted images was evaluated by the following method.

A 5-m-long sample was cut off from the multiconductor prepared in each example, and lenses (field of view of objective lens: 60 degrees, magnification of ocular lens: 40×) were attached to opposite ends of the sample to prepare an image scope. A 30 W fluorescent lamp positioned at a distance of 5 m from the objective lens was directly observed through the image scope. Generally, when the cladding layers of the multiconductor are lower in the effect to confine light, the fluorescent lamp is observed as more intensively colored around its luminescent portion. The image quality was therefore graded according to the degree of coloration around the luminescent portion of the lamp, as given below.

Excellent: No coloration was observed (abbreviated as "E").

Good: Red or green coloration was observed although very slight.

Poor: Considerably strong coloration was observed (abbreviated as "P").

The optical fibers present in the portion of the multiconductors of Examples 1–31 within at about 90% or more of the radius from the center of their cross section were fused to one another into a reguler honeycome structure.

TABLE 1

| Example | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Comp. Ex. 1 | Comp. Ex. 2 |
|---|---|---|---|---|---|---|---|---|---|---|---|---|---|---|---|---|
| Structure of optical fiber preform | | | | | | | | | | | | | | | | |
| Core | Material | Ge—SiO$_2$ | ″ | ″ | ″ | ″ | ″ | ″ | ″ | ″ | ″ | ″ | ″ | ″ | ″ | ″ |
| | n2 (at r2) | 1.471 | 1.471 | 1.470 | 1.474 | 1.476 | 1.473 | 1.475 | 1.473 | 1.473 | 1.475 | 1.475 | 1.475 | 1.475 | 1.457 | 1.460 |
| | n3 (at r3) | 1.474 | 1.473 | 1.473 | 1.476 | 1.478 | 1.475 | 1.477 | 1.475 | 1.476 | 1.478 | 1.478 | 1.477 | 1.478 | 1.465 | 1.469 |
| | n4 (at r4) | 1.476 | 1.475 | 1.478 | 1.480 | 1.481 | 1.478 | 1.481 | 1.478 | 1.480 | 1.481 | 1.481 | 1.481 | 1.482 | 1.472 | 1.474 |
| | n0−n1 | 0.025 | 0.024 | 0.028 | 0.030 | 0.031 | 0.027 | 0.030 | 0.026 | 0.029 | 0.030 | 0.030 | 0.029.9 | 0.031 | 0.025 | 0.028 |
| | Area ratio (%) | 28.9 | 33.0 | 37.0 | 32.8 | 25.4 | 33.6 | 37.8 | 26.0 | 35.1 | 29.8 | 29.8 | 29.9 | 26.0 | 28.4 | 33.4 |
| 1st cladding layer | Material | BF—SiO$_2$ | ″ | ″ | ″ | ″ | ″ | ″ | ″ | ″ | ″ | ″ | ″ | ″ | ″ | ″ |
| | n | 1.441 | ″ | 1.442 | ″ | ″ | 1.441 | ″ | 1.440 | ″ | ″ | 1.437 | 1.437 | 1.436 | ″ | ″ |
| | Area ratio (%) | 62.4 | 59.8 | 55.2 | 56.2 | 66.2 | 56.4 | 51.0 | 60.7 | 55.7 | 8.7 | 8.7 | 8.8 | 5.9 | 57.3 | 54.5 |
| 2nd cladding layer | Material | Pure SiO$_2$ | ″ | ″ | ″ | ″ | 1.453 | ″ | ″ | ″ | BF—SiO$_2$ | ″ | ″ | ″ | ″ | ″ |
| | n | 1.453 | ″ | ″ | ″ | ″ | 1.453 | ″ | ″ | ″ | 1.441 | 1.441 | 1.441 | 1.442 | ″ | ″ |
| | Area ratio | 8.7 | 7.2 | 7.8 | 11.0 | 8.4 | 10.0 | 11.2 | 13.3 | 9.2 | 49.8 | 49.8 | 40.8 | 58.1 | 14.3 | 12.1 |
| 3rd cladding layer | Material | — | — | — | — | — | — | — | — | — | Pure SiO$_2$ | ″ | ″ | ″ | — | — |
| | n | — | — | — | — | — | — | — | — | — | 1.543 | 1.453 | ″ | ″ | — | — |
| | Area ratio (%) | — | — | — | — | — | — | — | — | — | 11.7 | 11.7 | 20.5 | 10.0 | — | — |
| Structure of multiconductor | | | | | | | | | | | | | | | | |
| Dc (μm) | | 2.419 | 2.574 | 2.342 | 3.007 | 2.288 | 2.956 | 3.259 | 3.243 | 4.414 | 2.497 | 2.775 | 2.190 | 2.550 | 2.558 | 3.017 |
| T1 (μm) | | 0.940 | 0.871 | 0.677 | 0.973 | 1.029 | 0.941 | 0.868 | 1.339 | 1.343 | 0.170 | 0.188 | 0.149 | 0.137 | 0.943 | 0.939 |
| T2 (μm) | | 0.100 | 0.082 | 0.077 | 0.149 | 0.098 | 0.131 | 0.153 | 0.219 | 0.176 | 0.730 | 0.812 | 0.541 | 0.963 | 0.178 | 0.163 |
| T3 (μm) | | — | — | — | — | — | — | — | — | — | 0.138 | 0.153 | 0.220 | 0.129 | — | — |
| Df (μm) | | 4.50 | 4.48 | 3.85 | 5.25 | 4.54 | 5.10 | 5.30 | 6.36 | 7.45 | 4.57 | 5.08 | 4.00 | 5.00 | 4.80 | 5.22 |
| Dm (μm) | | 257 | 258 | 224 | 308 | 305 | 343 | 358 | 465 | 548 | 260 | 289 | 227 | 285 | 282 | 325 |
| Ts (μm) | | 10 | 10 | 10 | 5 | 8 | 9 | 12 | 11 | 14 | 8 | 9 | 6 | 7 | 8 | 11 |
| N (number) | | 2,960 | 3,020 | 3,070 | 3,120 | 4,080 | 4,110 | 4,140 | 4,850 | 4,900 | 2,940 | 2,940 | 2,920 | 2,950 | 3,130 | 3,520 |
| Transmitted images | | E | E | E | E | E | E | E | E | E | E | E | E | E | P | P |

| Example | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 |
|---|---|---|---|---|---|---|---|---|---|---|---|---|---|---|---|---|---|---|
| Structure of optical fiber preform | Same as in Ex. 1 | Same as in Ex. 2 | Same as in Ex. 3 | Same as in Ex. 4 | Same as in Ex. 5 | Same as in Ex. 6 | Same as in Ex. 7 | Same as in Ex. 10 | Same as in Ex. 11 | Same as in Ex. 1 | Same as in Ex. 2 | Same as in Ex. 3 | Same as in Ex. 4 | Same as in Ex. 5 | Same as in Ex. 6 | Same as in Ex. 7 | Same as in Ex. 10 | Same as in Ex. 11 |
| Structure of multiconductor | | | | | | | | | | | | | | | | | | |
| Dc (μm) | 2.419 | 2.574 | 2.342 | 3.007 | 2.288 | 2.956 | 3.259 | 2.497 | 2.775 | 2.419 | 2.574 | 2.342 | 3.007 | 2.288 | 2.956 | 3.259 | 2.497 | 2.775 |
| T1 (μm) | 0.940 | 0.871 | 0.677 | 0.973 | 1.029 | 0.941 | 0.868 | 0.170 | 0.188 | 0.940 | 0.871 | 0.677 | 0.973 | 1.029 | 0.941 | 0.868 | 0.170 | 0.188 |
| T2 (μm) | 0.100 | 0.082 | 0.077 | 0.149 | 0.098 | 0.131 | 0.153 | 0.730 | 0.812 | 0.100 | 0.082 | 0.077 | 0.149 | 0.098 | 0.131 | 0.153 | 0.730 | 0.821 |
| T3 (μm) | — | — | — | — | — | — | — | 0.138 | 0.153 | — | — | — | — | — | — | — | 0.138 | 0.153 |
| Df (μm) | 4.50 | 4.48 | 3.85 | 5.25 | 4.54 | 5.10 | 5.30 | 4.57 | 5.08 | 4.50 | 4.48 | 3.85 | 5.25 | 4.54 | 5.10 | 5.30 | 4.57 | 5.08 |
| Dm (μm) | 447 | 449 | 388 | 540 | 560 | 638 | 686 | 756 | 854 | 957 | 1,011 | 893 | 1,246 | 1,170 | 1,327 | 1,529 | 1,359 | 1,513 |
| Ts (μm) | 11 | 11 | 11.5 | 7 | 9.5 | 10 | 14 | 13 | 15 | 11 | 12 | 8.5 | 12.5 | 12.5 | 13 | 14.5 | 15 | 17.5 |
| N (number) | 8,960 | 9,120 | 9,200 | 9,600 | 13,800 | 14,200 | 15,200 | 24,800 | 25,600 | 41,000 | 46,200 | 48,800 | 51,100 | 60,200 | 61,440 | 75,500 | 80,200 | 80,500 |
| Transmitted images | E | E | E | E | E | E | E | E | E | E | E | E | E | E | E | E | E | E |

What is claimed is:

1. An optical multiconductor of the silica glass type characterized in that the multiconductor comprises $10^2$ to $10^7$ optical fibers of the silica glass type fused to one another, each of the optical fibers comprising a core made of doped silica glass and occupying at least 20% of the fiber in cross sectional area, and a cladding layer made of a material selected from the group consisting of doped silica glass and undoped silica glass, said cladding layer being formed on the core, said core having a refractive index distribution satisfying the following expression:

$$n2 \geq n1 + 0.50(n0 - n1)$$

wherein n0 is the refractive index of the core at its center, n1 is the refractive index of the core at its outermost portion, and n2 is the refractive index of the core at a position centered about the axis of the core and having an average radius of 0.65r1, r1 being the average radius of the core.

2. An optical multiconductor as defined in claim 1 wherein the difference (Δn) between the refractive index n0 of the core at its center and the refractive index n1 of the outermost core portion is 0.015 to 0.040.

3. An optical multiconductor as defined in claim 1 wherein the optical fibers present in the portion of the multiconductor within at least 80% of the conductor radius from the center of its cross section are fused to one another into a honeycomb structure which is substantially regular.

4. An optical multiconductor as defined in claim 1 wherein the multiconductor comprises $10^3$ to $5 \times 10^6$ optical fibers of the silica glass type.

5. An optical multiconductor as defined in claim 4 wherein the cladding layer comprises the two layers of a first cladding layer made of pure silica glass doped with fluorine and/or boron and a second cladding layer made of silica glass at least 1800° C. in drawing temperature, preferably pure silica glass.

6. An optical multiconductor as defined in claim 4, wherein the cladding layer comprises the three layers of a first cladding layer made of pure silica glass doped with fluorine and/or boron, a second cladding layer made of pure silica glass doped with fluorine and/or boron and being at least 0.002 higher than the first cladding layer in refractive index, and a third cladding layer made of silica glass at least 1800° C. in drawing temperature, preferably pure silica.

7. An optical multiconductor as defined in claim 4, wherein the diameter of the optical fiber (Df), the thickness of the first cladding layer (T1), and the thickness of the second cladding layer (T2) are 3.0 to 8.0 μm, 0.5 to 1.5 μm, and 0.03 to 0.6 μm, respectively.

8. An optical multiconductor as defined in claim 4 wherein the diameter of the optical fiber (Df), the thickness of the first cladding layer (T1), the thickness of the second cladding layer (T2), the thickness of the third cladding layer (T3) are 3.0 to 8.0 μm, 0.02 to 0.7 μm, 0.1 to 1.5 μm, and 0.02 to 0.6 μm, respectively.

9. An optical multiconductor as defined in claim 1 wherein the refractive index n3 of the core at a position centered about the axis of the core and having an average radius of 0.5r1 has a value satisfying the following expression:

$$n3 \geq n1 + 0.55(n0 - n1).$$

10. An optical multiconductor as defined in claim 9 wherein the refractive index n4 of the core at a position centered about the axis of the core and having an average radius of 0.33r1 has a value satisfying the following expression:

$$n4 \geq n1 + 0.60(n0 - n1).$$

11. An optical multiconductor of the silica glass type characterized in that the multiconductor comprises $10^2$ to $10^7$ optical fibers of the silica glass type fused to one another, each of the optical fibers comprising a core made of doped silica glass and occupying at least 20% of the fiber in cross sectional area, and a cladding layer made of a material selected from the group consisting of doped silica glass and undoped silica glass, said cladding layer being formed on the core, said core having a refractive index distribution satisfying the following expression:

$$n2 \geq n1 + 0.65(n0 - n1)$$

wherein n0 is the refractive index of the core at its center, n1 is the refractive index of the core at its outermost portion, and n2 is the refractive index of the core at a position centered about the axis of the core and having an average radius of 0.65r1, r1 being the average radius of the core.

12. An optical multiconductor as defined in any one of claims 4 to 8 wherein the optical fibers are 1,000 to 5,000 in number, the multiconductor being useful as the image transmitter of an endoscope for tubes or ducts in human body or an angioscope.

13. An optical multiconductor as defined in any one of claims 4 to 8 wherein the optical fibers are 5,000 to 30,000 in number, the multiconductor being useful as the image transmitter of an endoscope for the gastrointestinal organs.

14. An optical multiconductor as defined in any one of claims 4 to 8 wherein the optical fibers are 30,000 to 100,000 in number, the multiconductor being useful as the image transmitter of an endoscope for precision observation.

* * * * *